UNITED STATES PATENT OFFICE.

MANUEL FERNANDEZ MARTINEZ, OF JEREZ DE LA FRONTERA, SPAIN.

PROCESS OF PURIFYING POTASSIUM BITARTRATE.

No. 919,049.　　　Specification of Letters Patent.　　Patented April 20, 1909.

Application filed December 30, 1907. Serial No. 408,667.

*To all whom it may concern:*

Be it known that I, MANUEL FERNANDEZ MARTINEZ, a subject of the King of Spain, residing at Jerez de la Frontera, Spain, have invented certain new and useful Improvements in Processes for the Extraction Without Use of Fuel of Bitartrate of Potash, of which the following is a specification.

My invention relates to a process for the extraction or recovery of bitartrate of potash in a pure or nearly pure form, from wine lees, residual dregs, or the crude tartar which is deposited during the fermentation of grape juice.

The invention has for its object the realization of such a process without the consumption of fuel.

The various methods now commonly in use for the extraction of potassium bitartrate involve the application of a great deal of heat at various stages of the several processes.

To the end of reducing the great expense of such operations resulting from such application of heat, I have devised a process the several steps of which involve the application in the cold of the various chemicals used, and by which I am enabled to further reduce the expense by the use of wooden receptacles.

To more clearly set forth the exact nature of my improved process, I mix the argol or crude tartar obtained from the fermentation of grape juice, and which has been cleaned by any suitable means to remove extraneous dirt such as portions of grape stalks, etc., with either nitric, hydrochloric, hydrofluoric, or sulfuric acids, diluted with water and applied in the cold state; the tartar may, or may not, be applied in the pulverized state. The materials having been mixed as above, agitation is resorted to until the solid substances composing the crude tartar are thoroughly dissolved. The solution thus obtained is then filtered by means of a filter press. I then treat the filtered liquid with a suitable variety of clay, or with charcoal, which act as absorbents of the organic coloring matters contained which were originally derived from the grape juice or wine; I continue this operation until the liquid is decolorized. The next step in the process consists in the separation from the liquid so treated, of the various metallic salts which are usually associated with bitartrate of potassium in crude tartar; such salts usually consist of certain iron, copper, lead, magnesium and aluminium compounds which are derived from various sources during the formation of the dregs or tartar or from impurities in the chemicals used in the process.

The solution will usually contain a mixture of salts of the above named metals, and may also contain arsenic and ammonium compounds. I preferably neutralize such a solution by means of potash or the salts of this substance, or by means of soda and its salts, after which the metallic salts present are precipitated by the addition to the liquid of either sodium sulfid, potassium sulfid or ammonium sulfid.

When the metallic impurities present are confined to iron and copper compounds only, I may treat the original solution with the proper quantity of ferricyanid of potassium, which will produce a precipitate of ferricyanid of copper and of ferric ferricyanid.

When the original solution contains iron as the only metallic impurity, I add thereto the proper quantity of sulfocyanid of potassium, which, reacting with the iron salts present, will produce sulfocyanid of iron with its attendant red coloration. I may then introduce into the solution either amyl alcohol or ether, agitate thoroughly the mixture and allow to settle, when it will be found that the mixture has separated into two layers, of which the one consisting of the amyl alcohol or ether contains the sulfocyanid of iron, and the one consisting of the original acid solution will be found to be clear and free from any red coloration of the said sulfocyanid. The amyl alcohol or ether used may be recovered and purified by distillation.

The solutions obtained by the hereinbefore described method of treatment where several metals are involved, or in either of the special methods of treatment described are now subjected to filtration, by which means the precipitate is separated. To the acid solution thus treated and which is now free from metals, I add potash or any of its salts until no more bitartrate of potassium is precipitated. The clear liquid is decanted; I then subject the bitartrate of potassium to the action of a centrifugal machine, and finally dry it by any suitable means.

The mother liquid which is obtained by the above process will contain a considerable quantity of either chlorid, nitrate, fluorid or sulfate of potassium, according to the respective acid employed in the early stages of the process. I find no disadvantage to the working of my process by using this mother liquor several successive times; it will then be saturated with one of the above compounds to the extent that it is economical to recover the salt.

All the steps of the above described process may be carried out with the use of wooden vessels, and the chemical operations described are accomplished without the consumption of fuel.

Having thus described my invention what I claim is:—

1. The hereindescribed process for the extraction of bitartrate of potassium, which consists in treating crude tartar with a mineral acid in the cold state, filtering and decolorizing the resulting liquid, treating said liquid with an alkaline salt, precipitating the metallic compounds in the solution, filtering the solution, then adding a potash salt to the filtered solution to precipitate bitartrate of potassium, substantially as set forth.

2. A process for the extraction of bitartrate of potassium, which consists in dissolving crude tartar in a mineral acid in the cold state, filtering the resulting liquid and decolorizing it by means of clay, treating the liquid so obtained with a potash salt, precipitating foreign metallic substances by an alkaline sulfid, separating the said metallic precipitate by filtration, adding a potash salt to the filtered liquid whereby a pure precipitate of bitartrate of potassium is obtained, then subjecting the said bitartrate to the action of a centrifugal machine, and drying it, all the operations described being effected without the consumption of fuel, substantially as described.

In testimony whereof I affix my signature in presence of two witnesses.

MANUEL FERNANDEZ MARTINEZ.

Witnesses:
TOMÁS DE LA CUESTA,
FRANCISCO GARCIA.